(12) United States Patent
Tomich et al.

(10) Patent No.: US 8,795,801 B2
(45) Date of Patent: *Aug. 5, 2014

(54) CONFORMABLE BRAID

(71) Applicant: Albany Engineered Composites, Inc., Rochester, NH (US)

(72) Inventors: Aaron Tomich, Nashua, NH (US); Steve Biddle, Alton, NH (US)

(73) Assignee: Albany Engineered Composites, Inc., Rochester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,020

(22) Filed: Sep. 20, 2013

(65) Prior Publication Data

US 2014/0014258 A1    Jan. 16, 2014

Related U.S. Application Data

(63) Continuation of application No. 11/017,277, filed on Dec. 20, 2004, now Pat. No. 8,551,591.

(51) Int. Cl.
| | | |
|---|---|---|
| *B32B 1/08* | (2006.01) | |
| *D03D 13/00* | (2006.01) | |
| *D04C 1/06* | (2006.01) | |
| *B29C 70/22* | (2006.01) | |
| *B29C 70/02* | (2006.01) | |
| *B29C 70/48* | (2006.01) | |

(52) U.S. Cl.
CPC . *D04C 1/06* (2013.01); *B29C 70/48* (2013.01); *B29C 70/222* (2013.01); *B29C 70/023* (2013.01)
USPC ..... 428/36.1; 428/36.3; 428/36.9; 428/36.91; 428/36.92; 442/204

(58) Field of Classification Search
CPC .......... B65D 29/00; B65D 29/04; B32B 5/02; B32B 5/024; B32B 5/08; B32B 5/12; B32B 11/16; D03D 1/00; D03D 1/04; D03D 3/00; D03D 3/02; D03D 7/00; D03D 9/00; D03D 13/00; D03D 13/004; D03D 15/0094
USPC ......... 428/34.1, 35.7, 36.1, 36.3, 36.9, 36.91, 428/36.92; 442/204

See application file for complete search history.

(56) References Cited

U.S. PATENT DOCUMENTS

| | | | |
|---|---|---|---|
| 5,419,231 | A | 5/1995 | Earle, III et al. |
| 5,619,903 | A | 4/1997 | Rogers et al. |

(Continued)

FOREIGN PATENT DOCUMENTS

| | | | |
|---|---|---|---|
| EP | 0 113 196 A | 7/1984 | |
| EP | 0 249 333 A | 12/1987 | |

(Continued)

OTHER PUBLICATIONS

International Search Report issued by European Patent Office for international application PCT/US2005/045069 which is related to parent application U.S. Appl. No. 11/017,277, mailing date May 24, 2006.

*Primary Examiner* — Walter B Aughenbaugh
(74) *Attorney, Agent, or Firm* — Frommer Lawrence & Haug LLP; Ronald R. Santucci

(57) ABSTRACT

A tubular structure which includes a plurality of axial sites in circular relation to one another and a plurality of bias sites that interconnect the axial sites to form the tubular structure. The tubular structure's axial sites have a greater diameter than the structure's bias sites.

4 Claims, 5 Drawing Sheets

(56) References Cited

U.S. PATENT DOCUMENTS

| | | |
|---|---|---|
| 5,671,649 A | 9/1997 | Piotrowski et al. |
| 5,712,010 A | 1/1998 | Russek et al. |
| 5,899,134 A | 5/1999 | Klein et al. |
| 6,128,998 A | 10/2000 | Freitas et al. |
| 6,231,941 B1 | 5/2001 | Cundiff et al. |
| 6,250,193 B1 | 6/2001 | Head |
| 6,647,852 B1 | 11/2003 | Freitas et al. |
| 8,551,591 B2 * | 10/2013 | Tomich et al. ............... 428/36.1 |
| 2003/0183067 A1 | 10/2003 | Cundiff et al. |

FOREIGN PATENT DOCUMENTS

| | | |
|---|---|---|
| EP | 0 809 726 B | 11/1999 |
| EP | 1 586 686 A | 10/2005 |
| GB | 2 336 419 A | 10/1999 |

* cited by examiner

CONFORMABLE BRAID

This is a continuation of U.S. patent application Ser. No. 11/017,277 filed Dec. 20, 2004, now U.S. Pat. No. 8,551,591 the disclosure of which is incorporated herein by reference.

BACKGROUND OF THE INVENTION

1. Field of the Invention

The present invention relates generally to braided structures and more particularly to conformable braided structures that are characterized by axial sites and bias sites, where the axial sites have a greater diameter than the bias sites. The conformable braided structures are mathematically designed to meet the perimeter and area requirements of target gap area to be filled in a structure.

2. Background of the Invention

Resin transfer molding has been around for many decades, and its use has grown considerably in recent years. The process allows the economical manufacture of high quality composites. The term "composite" has been used principally to define a class of materials in which a matrix material, such as plastics (both thermosetting and thermoplastic), metals, or ceramics are reinforced by strengthening fibers in the form of a preform. Composites are advantageous since the final structure exhibits properties which are a combination of the properties of the constituent materials (i.e., the fiber reinforcement and matrix material).

In accordance with the process, a resin system is transferred at low viscosities and low pressures into a closed mold die containing a preform of dry fibers. The dry fibers, which may have the form of continuous strand mat, unidirectional, woven, or knitted preforms, are placed in a closed mold and resin is introduced into the mold under external pressure or vacuum. The resin cures under the action of its own exotherm, or heat can be applied to the mold to complete the curing process.

The resin transfer molding process can be used to produce low-cost composite parts that are complex in shape. These parts typically provide continuous fiber reinforcement, along with inside mold line and outside mold line controlled surfaces. It is the placement of the continuous fiber reinforcements in large structures that sets resin transfer molding apart from other liquid molding processes.

In the past, resin transfer molding was used for applications suitable to consumer product markets. However, in the last few years, through the development of high-strength resin systems and more advanced pumping systems, resin transfer molding has advanced to new levels. These recent developments have promoted resin transfer molding technology as a practical manufacturing option for high-strength composite designs, particularly in the aerospace industry.

In the aerospace industry, the most visible advantage to the resin transfer molding process lies in resin transfer molding's ability to combine multiple, detailed, components into one configuration. For example, many traditional designs consist of many individual details that are combined as a subassembly. These subassemblies usually require labor-intensive shimming, bonding, mechanical fastening and sealing. Consequently, these subassemblies demonstrate high part-to-part variability due to tolerance build-up.

Resin transfer molding produces smooth surfaces. Being a product of the mold makes the surface quality of the part produced within the mold comparable to that of the tool's surface. Resin transfer molding also provides control of the fiber/resin ratio in the completed product. This advantage produces parts that are lightweight and high in strength.

However, when multiple detailed components having rounded edges are combined, the concavity of the edges causes gaps to be formed at the point where the components join together. Consider the geometries shown in FIGS. 1A and 1B, which are typical of the types of cross-sections that often need to be filled with "radius gap-filler" material during construction of a composite lay-up. One method to fill this volume with fiber is to lay-in individual ends of fiber. However, this method can be tedious and inefficient. An alternative method of filling this volume is to use a braided "gap-filler" component that holds multiple ends of the fiber together in a single piece. A drawback of this alternative is that gap filler is typically rigid and not easily conformable to varying cross-sections. Specialty braiders are available that can produce material to a specific geometry, but that geometry is then applicable only to a single application. Generic tubular braids are somewhat conformable to varying shapes, but geometric constraints of the braiding process make it difficult to obtain both the correct fiber volume and the correct perimeter for concave or complex shapes such as that of FIGS. 1A and 1B.

For example, consider again the geometry shown in FIG. 1A where the length of the sides of the concave gap or area 8 to be filled is indicated by 10 and 12 and the radius of the concave gap or area 8 to be filled is indicated by 14. In this example assume that the length of the sides, 10 and 12 of the concave gap 8 to be tilled is 0.500 in. each. Further, assume that the radius of the concave gap 14 is approximately 0.500 in. In order to function as an acceptable gap filler that will be conformable to the shape of the gap, a braid must have roughly the same cross-sectional area (0.054 sq. in.) and perimeter (1.785 sq. in.) as the concave gap 8 in FIG. 1A. FIGS. 2A and 2B show the two extremes possible when trying to produce a circular or maypole braid to meet the area and perimeter criteria of FIG. 1A. In one case, as depicted in FIG. 2A where the braid radius 16 is 0.284 in., the perimeter is fixed at 1.785 in, and the area of the solid braid (0.253 sq. in.) is too high. In the other case, as depicted in FIG. 2B where the braid radius 16 is 0.131 in the area is fixed at 0.054 sq. in. and the perimeter of the solid braid (0.283 in.) is too low.

In some cases it is possible to avoid the dilemma described above with conventional maypole braids via the use of mandrels. In fact, braids have the property of being conformable to mandrels of various cross-sections. However, this capability is limited in that the mandrel must have no concave geometry. Thus, one typically must attempt to braid around a convex geometry of the target perimeter, then deform this perimeter to the desired concave shape after braiding. However, the area bounded by the initial convex braid prior to deformation will always be higher than the target area of the concave geometry. This is shown in FIG. 3 by the circular cross-section of a braided sheath about an undersized core 18 with an idealized perimeter but also having a high internal void area 24. As opposed to the solid braid in FIG. 2A in which the area of fiber is too large, the braid in FIG. 3 shows a solid core of fiber 22 sized appropriately to meet the area requirement. Any attempt to fill the void area 24 between the solid core of fiber 22 and the braided sheath 20 with unidirectional fibers would be futile, as the core would simply "fall out" of the sheath.

U.S. Pat. No. 6,231,941 discloses a radius or gap filler to fill concave areas as depicted in FIGS. 1A and 1B. As disclosed, a braided sleeve surrounds a number of unidirectional tows (untwisted filaments). The core of the unidirectional tows can be of uniform cross section, or can be varied in cross-section along its length so as to fit a particular gap. The radius filler is formed on a mandrel that includes a contoured surface that is substantially the same shape as depicted in FIG. 1A or FIG.

1B. The braided sleeve is braided around the unidirectional tows and is then soaked with a tackifier. The braided sleeve with the unidirectional tows therein is then placed on the mandrel surface and is vacuum bagged under a bladder. The bagged radius filler is then placed in an autoclave and heat is applied while vacuum is applied to the bladder. The bagged radius filler is heated until the tackifier on the braided sleeve is procured or semi-hardened. Since the tackifier is only semi-hardened, it acts as a binding agent to maintain consolidation and configuration of the braided sleeve until the final transfer molding of the component to be filled is performed. However, this process requires specially designed mandrels to construct the specific gap filler required which is a time consuming, laborious and expensive process.

Accordingly, a need exists for a braided gap filler that can be designed so that it is conformable to gaps with varying cross sections, that can be constructed using conventional braiding techniques.

SUMMARY OF THE INVENTION

It is the object of the present invention to provide a tubular structure that is conformable to concave gaps or complex shapes.

The present invention is directed to a tubular structure which includes a plurality of axial sites in circular relation to one another and a plurality of bias sites that interconnect the axial sites to form the tubular structure. The tubular structure's axial sites have a greater diameter than the structure's bias sites.

Another aspect of the present invention relates to a method for forming the conformable braid. The method includes calculating the perimeter and the area of the gap that is to be filled by the braid. Next, based on the perimeter and area of the gap, the number of carriers on a braider and the diameter of the circular axial tows are calculated. Once the calculations are completed, the conformable braid is fabricated with a plurality of axial tows that form the sheath of the braid. Since the resulting sheath of the braid was designed based on the perimeter and area requirements of the gap to be filled, upon being conformed, the gap is filled by the braid.

A further aspect of the present invention relates to a method of reinforcing a woven structure. The method includes providing a tubular structure with a plurality of axial sites in circular relation to one another and a plurality of bias sites interconnecting the axial sites to form the tubular structure. The tubular structure's axial sites have a diameter which is greater than the diameter of the bias sites. Once provided, the tubular structure is inserted and conformed to at least one surface of the woven structure to be reinforced. Finally, the combination of the woven structure and the tubular structure is impregnated with a resin material.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated in the accompanying drawings in which corresponding components are identified by the same reference numerals.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PREFERRED EMBODIMENTS

Figure 1A:
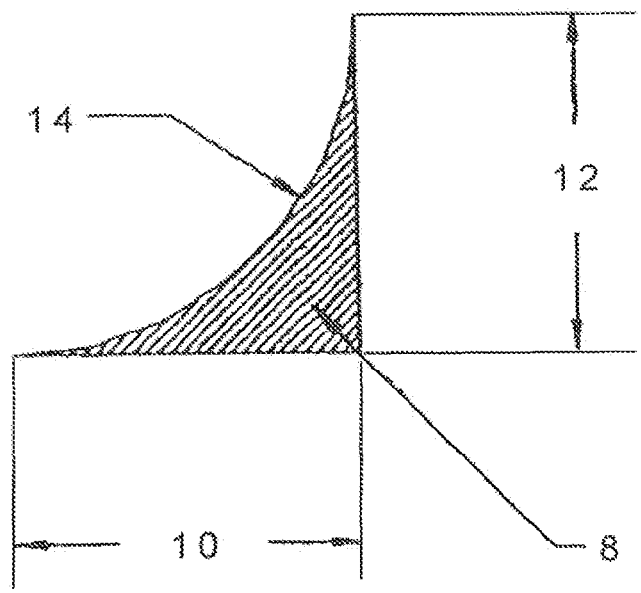
FIG. 1A depicts a concave gap that is to be filled with fibers.
Figure 1B:
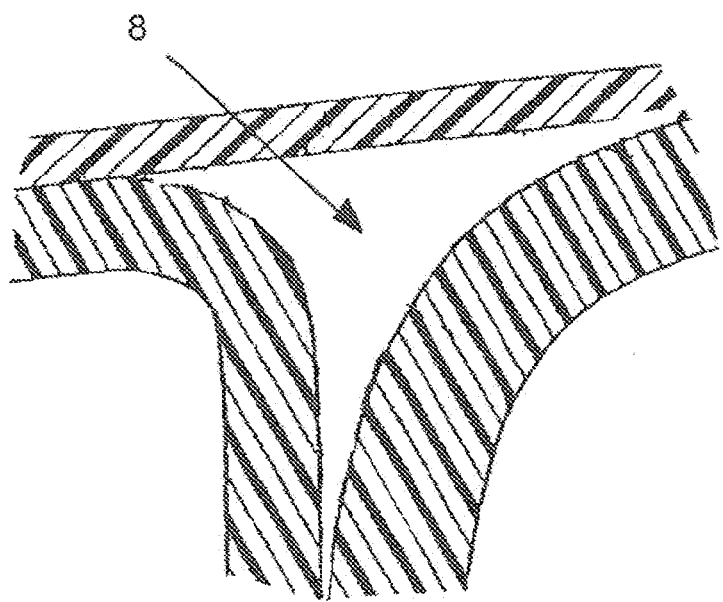
FIG. 1B depicts a complex gap that is to be filled with fibers that is formed when curved structures are joined.
Figure 2A:
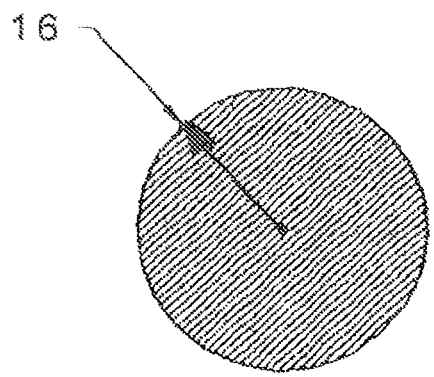
FIG. 2A depicts a known solid circular braid with a perimeter equal to the perimeter of the gap to be filled in FIG. 1A.
Figure 2B:
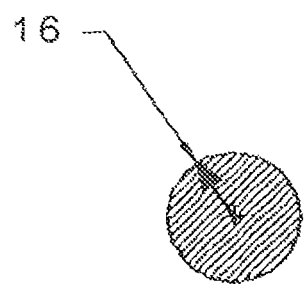
FIG. 2B depicts a known solid circular braid with an area equal to the area of the gap to be filled in FIG. 1A.
Figure 3:
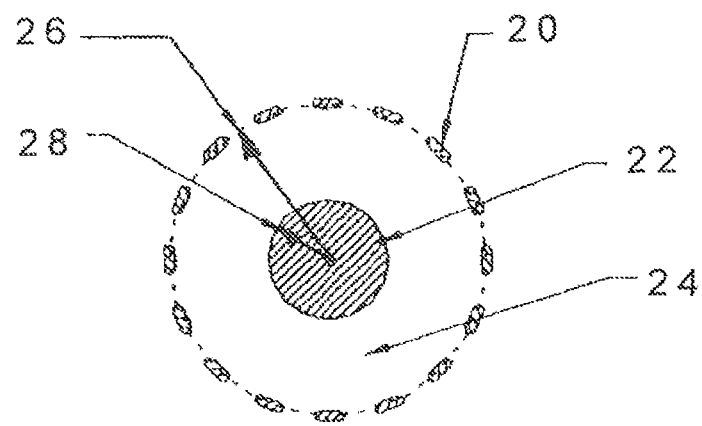
FIG. 3 depicts a braided sheath with an undersized solid core that meets both the area and perimeter requirements of the gap to be filled in FIG. 1A.

As previously described and illustrated in FIGS. 2A and 2B, it is difficult and almost impossible to design a conventional braided tubular structure that meets both the area and perimeter requirements of the concave gaps or complex shapes depicted in FIGS. 1A and 1B. Previously, in order to meet both the area and perimeter requirements of a complex gap, a structure 18 consisting of a braided sheath 20 surrounding an undersized solid fiber core 22, would be constructed as depicted in FIG. 3, in order to satisfy the area and perimeter requirements of FIG. 1A, the radius 26 of the braided sheath 20 would be 0.284 in. and the radius 28 of the fiber core 22 would be 0.093 in. The area of the solid fiber core 22 satisfies the area requirement of FIG. 1A and the perimeter of the braided sheath 20 satisfies the perimeter requirement of FIG. 1A. However, as depicted in FIG. 3, a void area 24 is created between the solid fiber core 22 and the braided sheath 20. Any attempt to fill the void area 24 would be futile since the solid fiber core 22 would simply "fall out" of the sheath 20. This could lead to delamination of the finished composite structure.

Figure 4:
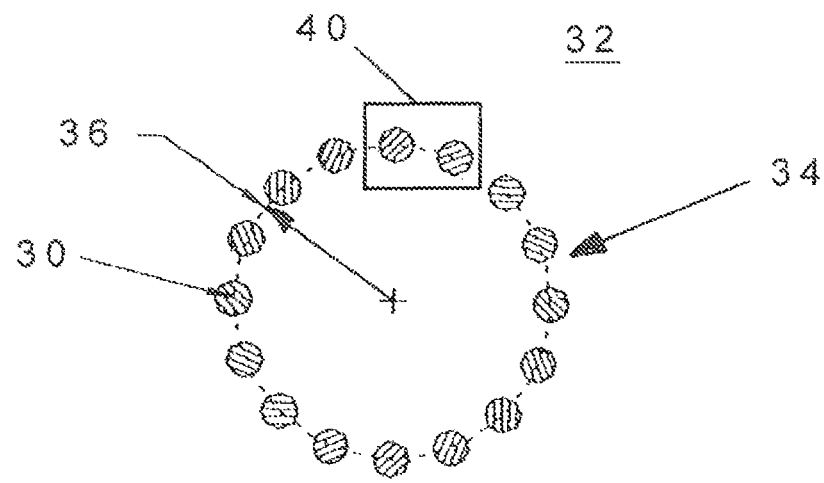
FIG. 4 depicts one aspect of the present invention with oversized axial sites.

Therefore, the present invention relates to a tubular structure 32 comprised of large, unbraided, circular axial tows or sites 30 as depicted in FIG. 4. The axial tows 30 are made up of the core material used for the solid fiber core 22 in FIG. 3. By moving the fiber core material 22 to the axial sites 30 of the braid as depicted in FIG. 4, the conformable braid 32 now consists of a sheath 34 without a core. The fiber area of the axial sites or tows 30 alone satisfies the entire area requirement of the gap to be filled depicted in FIG. 1A. Furthermore, the diameter of these axial sites 30 has been controlled such that the perimeter of the braid can be accurately predicted. The radius 36 of the braid 32 is 0.284 in. As demonstrated by FIG. 3, both the axial fiber area and the perimeter of the conformable braid 32 in FIG. 4 are in agreement with the targets defined by FIG. 1A. Hence, the conformable braid can be used to fill a target gap or complex shape and reinforce a structure.

The mathematical relationship of the area and the perimeter of the gap or complex shape to be filled is shown below for the simplified case of an axial tow having a circular cross-section:

$$A = (n/2)(\pi d^2/4) \quad (1)$$

$$P = (n/2)d \quad (2)$$

where:
- A=desired area of gap filler
- P=desired perimeter of gap filler
- n=number of carriers (part of a braiding machine that carries the group of yarns or a single yarn, through the braid as it is made)on the braider
- n/2=number of axial sites on the braider
  (note standard braiders contain one axial site for every 2 carriers)
- d=diameter of the axial tow For a given area and perimeter, equations (1) and (2) define the size of the braider and axial tow required.

Figure 5:
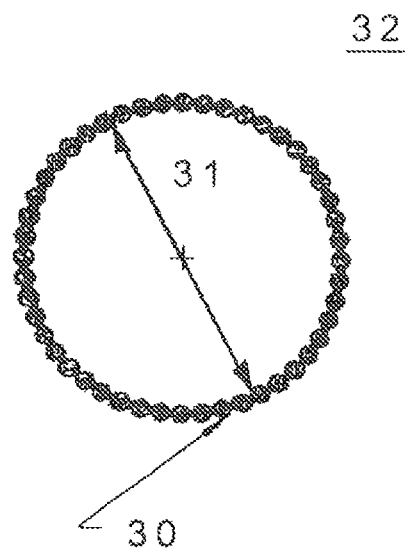
FIG. 5 depicts a conformable braid, according to one embodiment of the present invention.

Using an example, if the requirements shown in FIG. 1A are substituted into equations (1) and (2) above, then the values of "n/2" and "d" calculate to be 46.3 in. and 0.0385 in., respectively. Since braiders come in discreet sizes, set the value of "n/2" to 48 which corresponds to a 96 carrier braider (a common size). Now using equation (2) above and an "n/2" equal to 48, re-calculate "d" 31 to be 0.037 in. FIG. 5 shows the axial cross-section of the 96 carrier conformable braid 32 defined by this example. The size of the axial tows 30 turn out to be representative of what could be achieved using a single end of commercially available 12K carbon.

Figure 6:
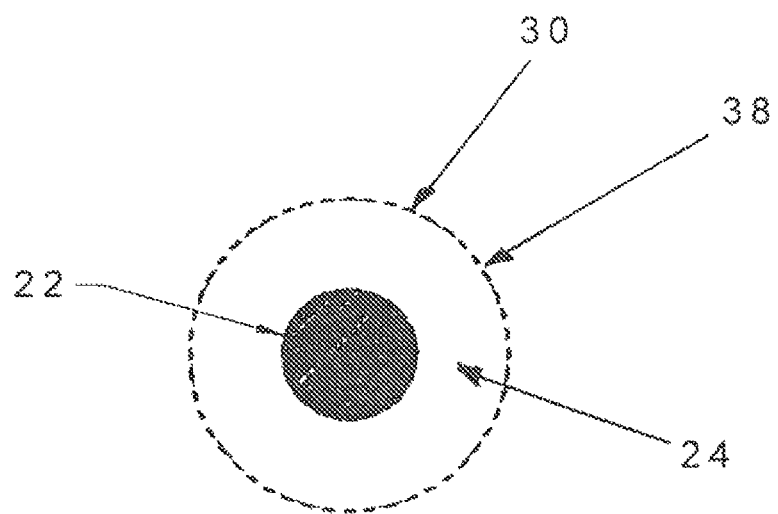
FIG. 6 depicts a standard triaxial design according to the prior art.

FIG. 6 depicts a prior art design using the same size braider and a standard, triaxial construction. For simplicity only the axial tow cross-sections 30 are shown. In order to make room for similarly sized bias fibers that must travel over and under or otherwise around the axials or tows 30 in FIG. 6, spacing 38 must exist between the axial tows 30 as shown. Subsequently, in order for the circumference of the braid to be close to the target value, the size of the axial tows 30 in FIG. 6 must be smaller than those shown in FIG. 5. Hence, it has been demonstrated that a standard braided equivalent to the conformable braid does not satisfy the criteria of having the majority of its fiber weighted in the axial direction. FIG. 6 depicts the cross-section of a solid fiber 22 that would still be required in the core of the braid in order to satisfy the FIG. 1A area requirement. As with FIG. 3, it can be seen that the void volume 24 within this cross-section is significantly higher than the size of the core, such that the core and sheath are unlikely to behave as a single component as is the case with the conformable braid structure. This represents a problem both in terms of handleability, and in the likelihood for de-lamination to occur between core and sheath in the composite.

It is possible to form a structure similar to that of FIG. 3 using a traditional triaxial braid. However, the uniqueness of the conformable braid concept is that almost all of the required fiber volume is in the form of the axial tows or fibers. Thus, the bias fiber that holds the conformable braid together is extremely small in cross-section relative to the axial fiber. The function of the bias fiber in this case is to loosely hold the axial tows together such that the conformable braid still has the advantage of being a single piece that is easy to handle, but at the same time has a high percentage of axial fibers with the ability to roll over each other semi-freely thus allowing good conformability to the final gap or complex shape cross-section. Therefore, in one embodiment of the present invention, the bias fibers are not used to impart strength on the conformable braid but instead to simply hold the axial fibers together until the braid is inserted into the target gap or complex shape and the structure is impregnated with resin.

Figure 7:
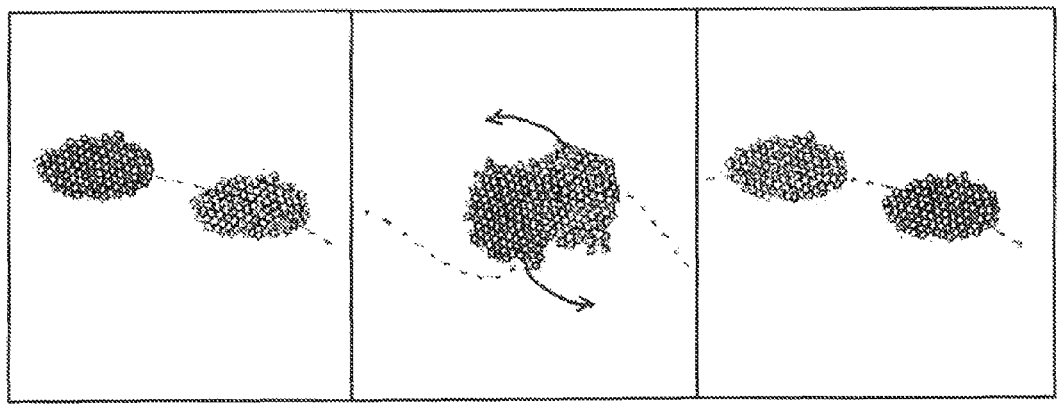
FIG. 7 depicts adjacent uribraided axial sites or tows during roll over, according to one embodiment of the present invention.
Figure 8:
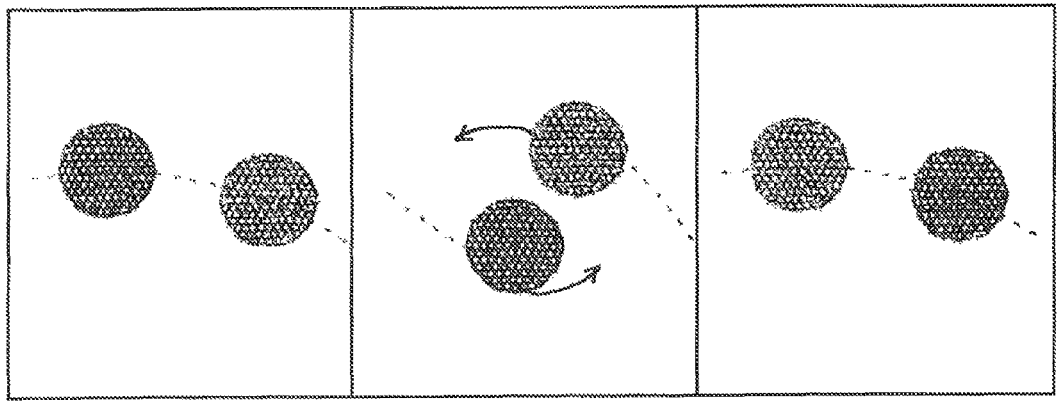
FIG. 8 depicts adjacent braided axial sites or tows during roll over, according to one embodiment of the present invention.

In another embodiment of the present invention, braided tows are utilized within the axial sites 30 of the conformable braid itself. Take for example two adjacent tows 40 as depicted in FIG. 4. Triaxial braids traditionally incorporate either individual or multiple ends of fiber. These ends tend to take on elliptical cross-sections and the shape of these cross-sections is difficult to predict and control as depicted in FIG. 7. By utilizing solid braids in the axial sites of the conformable braid as depicted in FIG. 8, one can be confident that the cross-sectional shape of the axial tows is circular. Equations (1) and (2) then become far more accurate and thus the ability to design the conformable braid to a given combination of perimeter and area becomes more reliable. In addition, a key property of the conformable braid is the ability of the axial sites to roll over each other when conforming to a given geometry as depicted in FIGS. 7 and 8. The circular geometry of the braided axial tows as depicted in FIG. 8 should lend itself better to this effect than the oval geometry of a non-braided axial tow as depicted in FIG. 7 because the oval geometry of the upbraided tows lead to higher frictional forces when the tows roll over each other. With the axial-site fiber being in braided form, frictional forces between individual filaments should be minimized, since the surface area to mass ratio of the axial site is far less for the braided configuration as shown in FIG. 8.

The concept of using braids in the axial sites is applicable to other materials that, similarly to braids, have fairly rigid, circular cross-sections. The most apparent alternative of this may be pultruded rods.

Accordingly, it has been shown that a conformable braid where the fiber core material is moved to the axial sites can be designed to satisfy both the area and perimeter requirements of a concave or complex gap that needs to be filled prior to the introduction of a matrix material.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. A conformable braided tubular structure comprising:
   a plurality of axial sites in circular relation to one another, said axial sites being unbraided tows or braided tows or pultruded rods; and
   a plurality of bias sites, comprising bias fibers interconnecting said axial sites;
   wherein the cross-section of the axial sites is greater than the cross-section of the bias sites,
   wherein the plurality of bias sites loosely interconnects said axial sites to form the tubular structure such that at least some of the axial sites are adapted to roll over each other,
   wherein the conformable tubular structure is inserted and conformed to at least one surface of another structure to form a combination of the another structure and the conformable tubular structure, the at least some of the axial sites adapted to roll over each other when the conformable tubular structure is being conformed to a gap or complex shape of the another structure,
   wherein the combination of the another structure and the conformable tubular structure is impregnated with a resin material after the conformable tubular structure is conformed to the another structure, wherein a diameter of the axial sites is greater than a diameter of the bias sites.

2. The tubular structure of claim 1, wherein the axial sites are unbraided tows.

3. The tubular structure of claim 1, wherein the axial sites are braided tows.

4. The tubular structure of claim 1, wherein the axial sites are pultruded rods.

* * * * *